(No Model.)  2 Sheets—Sheet 1.

C. P. STEINMETZ.
ELECTRIC METER.

No. 539,452.  Patented May 21, 1895.

WITNESSES—
A. F. Macdonald.
B. B. Hull.

INVENTOR—
Charles P. Steinmetz
By his Atty. R. Blodgett (No Model.)  2 Sheets—Sheet 2.

C. P. STEINMETZ.
ELECTRIC METER.

No. 539,452.  Patented May 21, 1895.

Witnesses
A. F. Macdonald.
B. B. Hull.

Inventor
Charles P. Steinmetz
By Geo. R. Blodgett
Atty

UNITED STATES PATENT OFFICE.

CHARLES P. STEINMETZ, OF SCHENECTADY, NEW YORK, ASSIGNOR TO THE GENERAL ELECTRIC COMPANY, OF NEW YORK.

ELECTRIC METER.

SPECIFICATION forming part of Letters Patent No. 539,452, dated May 21, 1895.

Application filed February 19, 1895. Serial No. 538,982. (No model.)

*To all whom it may concern:*

Be it known that I, CHARLES P. STEINMETZ, a subject of the Emperor of Germany, residing at Schenectady, county of Schenectady, State of New York, have invented certain new and useful Improvements in Electric Meters, of which the following is a specification.

The present invention relates to an electric meter designed for use on monocyclic circuits, consisting, as is now well known in the art, of two main leads designed to convey the larger part of the power consumed in the circuit, and a teaser wire or main, on which an electromotive force of displaced phase is maintained. To indicate or make a permanent record of the ampères or watts consumed in such a circuit I have devised the meter hereinafter described, which consists in general of two motor mechanisms mounted on the same shaft or geared so as to run in unison, which actuate the recording or indicating mechanism and are retarded by a damping mechanism of any desired character. The field coils of one of the motor mechanisms are included directly or inductively in one or both of the main leads of the circuit, and the corresponding armature is connected in a shunt across the main leads, and in series with a resistance of suitable amount. The field coils of the second motor mechanism are included in the third or teaser main, and its armature is connected between the teaser main and a neutral point dividing the voltage across the main leads. When such a mechanism is provided with damping mechanism properly adjusted and a recording train, a permanent record of the watts consumed in the circuit will be secured in a manner resembling the well-known Thomson watt meter. The invention, however, is equally applicable to ammeters or to electro-dynamometers when provided with suitable indicating apparatus.

Figure 1:
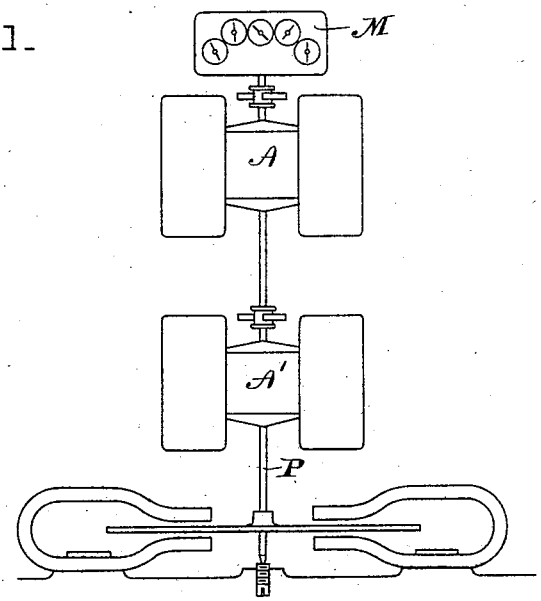
Figure 2:
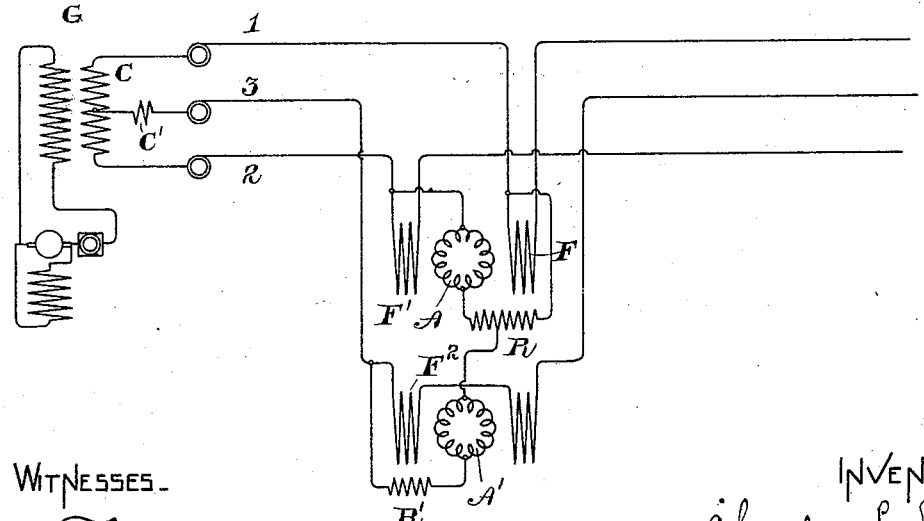

In the accompanying drawings, Figure 1 shows certain parts of the meter, illustrating its mechanical construction. Fig. 2 is a diagram of circuits, showing one method in which the meter may be arranged; and Figs. 3, 4, 5, and 6 are diagrams showing various modifications.

Figure 3:
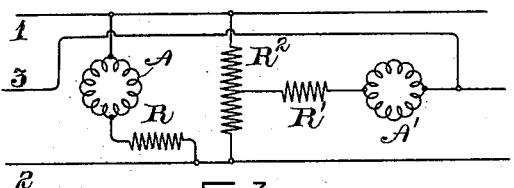

Referring first to Fig. 2, G represents a monocyclic generator having main and teaser coils $C$ $C'$ connected by collector rings to the main leads 1, 2, and to the third, or teaser wire 3, as is customary in the art. The motor mechanism of the meter comprises field coils $F$ $F'$ in series with the leads 1, 2, so that the excitation due to these field coils will be proportional to the current flowing in the main leads. The armature shown diagrammatically at A is connected in a shunt across the leads 1, 2, and in series with a resistance R. Mounted on the same shaft with the armature A is a second armature $A'$ rotating in the field of coils $F^2$, which are included in the teaser wire 3. The armature $A'$ is connected between the teaser wire and a point in the resistance R, selected to divide the voltage between the mains 1, 2, a resistance, $R'$ being included in the connection. The field coils are therefore in the main and teaser lines, and the two armatures have the characteristic main and teaser connections, which, it will be observed, correspond with that of the coils $C$ $C'$ of the generator. The arrangement just described, while embodying the invention, has the disadvantage that the teaser armature current partly returns through the main armature. Hence for greater accuracy, the modification shown in Fig. 3 is preferable. In this figure, as well as in Figs. 4 and 5, only the armature connections are shown, since the arrangement of the field coils will be the same as in Fig. 1.

In Fig. 3 the main armature A is coupled across the mains 1, 2, in the same manner as in Fig. 2, but a separate resistance $R^2$ is used across the mains 1, 2, furnishing the neutral point at its center between which and the teaser wire 3, the teaser armature $A'$ is connected.

Figure 4:
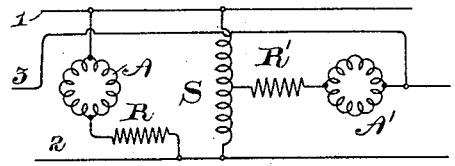

In Fig. 4 I show that an inductance S may be used to replace the resistance $R^2$ of Fig. 3. In many cases the inductance is preferable. It consists as shown, of a single coil transformer, to the central point of which the teaser armature $A'$ is connected through the resistance $R'$. The main armature is arranged in the same manner as in the preceding figures.

Figure 5:
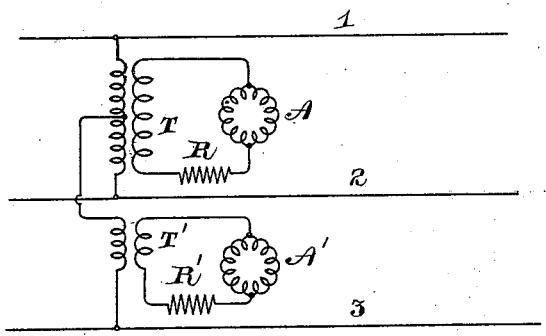

In Fig. 5 I show the armatures inductively connected instead of by direct electrical connections. T is a transformer whose primary is connected across mains 1, 2, and whose secondary includes the main armature and resistance R. A teaser transformer T' has its primary connected between the teaser main 3 and the center of the primary of transformer T. The secondary of transformer T' includes the teaser armature A' and resistance R'. With this modification the resistance $R^2$, Fig. 3, or the inductance S, Fig. 4, is unnecessary, since the transformer T supplies the neutral point and thus divides the circuits properly.

Figure 6:
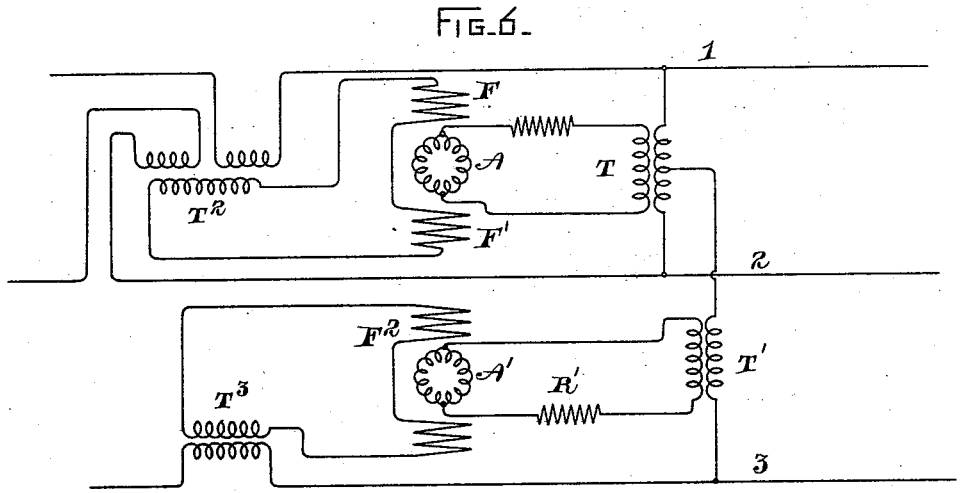

In cases where the potentials are high the field coils of the meter may be supplied through transformers, as shown in the modification, Fig. 6. Here $T^2$ is a transformer having primary coils in series with the main leads 1, 2, and a secondary coil in circuit with the main field coils F F'. The corresponding armature A is in the secondary circuit of the transformer T arranged in a manner similar to Fig. 5. The primary of transformer T is connected across the mains 1,2, and to its central point is connected the primary of teaser transformer T'. The second set of field coils $F^2$ is similarly supplied from the transformer $T^3$ in the teaser main 3, and its armature A' is in the circuit of the secondary of transformer T', the resistance R' being used, as in the previous modification.

In Fig. 1 there are shown certain of the mechanical features of the meter. The armatures A A' are mounted on a common shaft P and the rotation of the shaft is braked by a damping mechanism, which may be of any of the usual types, but is shown as a magnetic damper similar to that ordinarily used in the Thomson recording watt meter. A recording mechanism M is driven by the shaft through any desired form of gearing.

What I claim as new, and desire to secure by Letters Patent of the United States, is—

1. An electric meter for monocyclic circuits, comprising separate field coils whose exciting currents are respectively maintained equal or proportional to the currents in the main or teaser circuits, and separate armatures, one coupled directly or inductively across the main power leads, and the other between the teaser wire and a neutral point dividing the voltage in the main circuit.

2. A meter for monocyclic circuits, comprising recording and braking mechanism, and two armatures on the same shaft or geared together, one in circuit across the main power leads with an appropriate resistance, and the other in circuit between the teaser wire and a neutral point dividing the voltage in the main circuit, field coils for the two armatures, and means for maintaining the excitation of the field coils proportional respectively to the current flowing in the main and teaser circuits.

3. An electric meter for monocyclic circuit, comprising field coils and an armature connected electrically or inductively, the one in series with and the other across the main circuit leads, a separate shunt across the main leads affording a neutral point where the voltage is divided equally, and a second armature and field coil connected respectively in the circuit of the teaser wire and between the teaser wire and the neutral point, as set forth.

In witness whereof I have hereunto set my hand this 14th day of February, 1895.

CHARLES P. STEINMETZ.

Witnesses:
B. B. HULL,
A. F. MACDONALD.